No. 878,177.
PATENTED FEB. 4, 1908.
O. ANDERSON.
CLUTCH.
APPLICATION FILED AUG. 21, 1906.
3 SHEETS—SHEET 3.
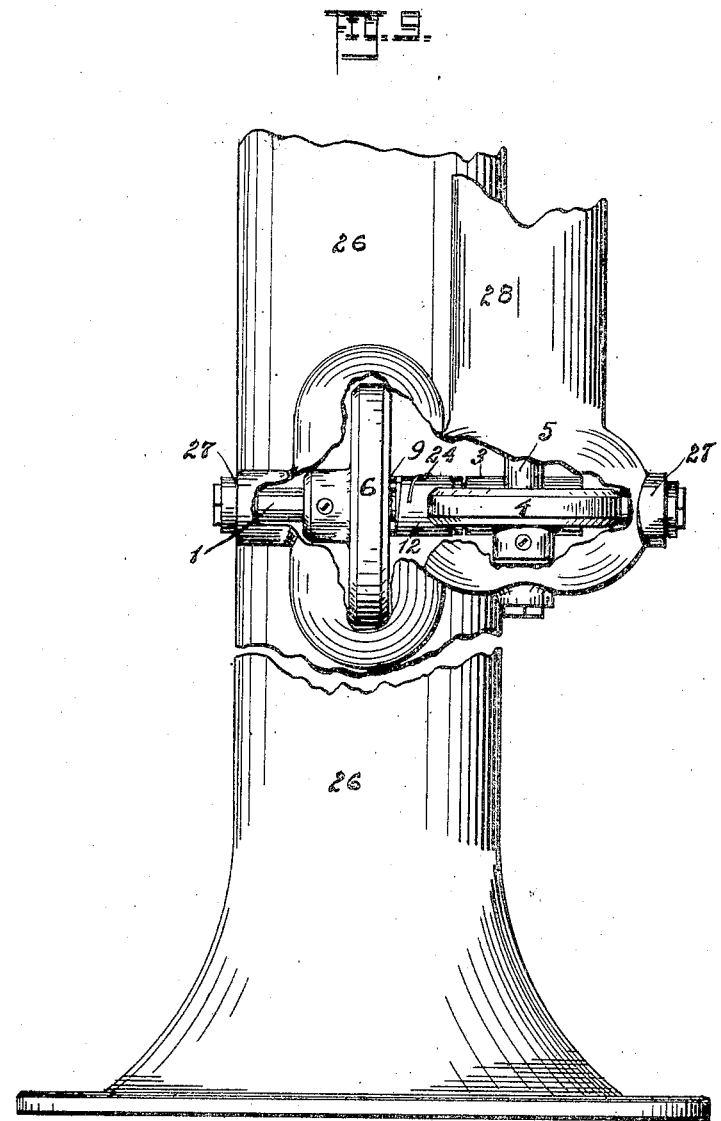
WITNESSES
Frederick Germain Jr
Ethel B. Reed
INVENTOR
OSCAR ANDERSON,
BY
Russell M. Everett
ATTORNEY.

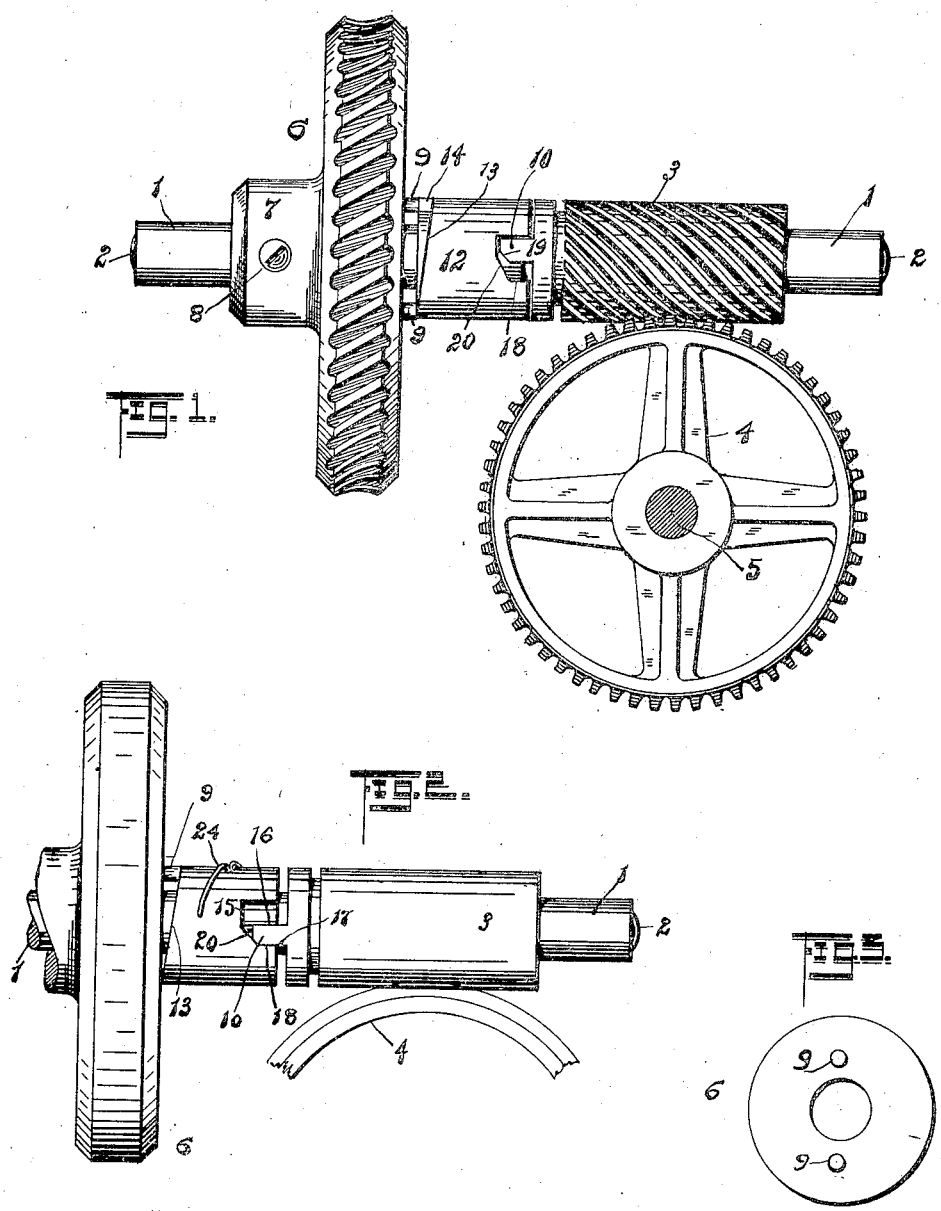

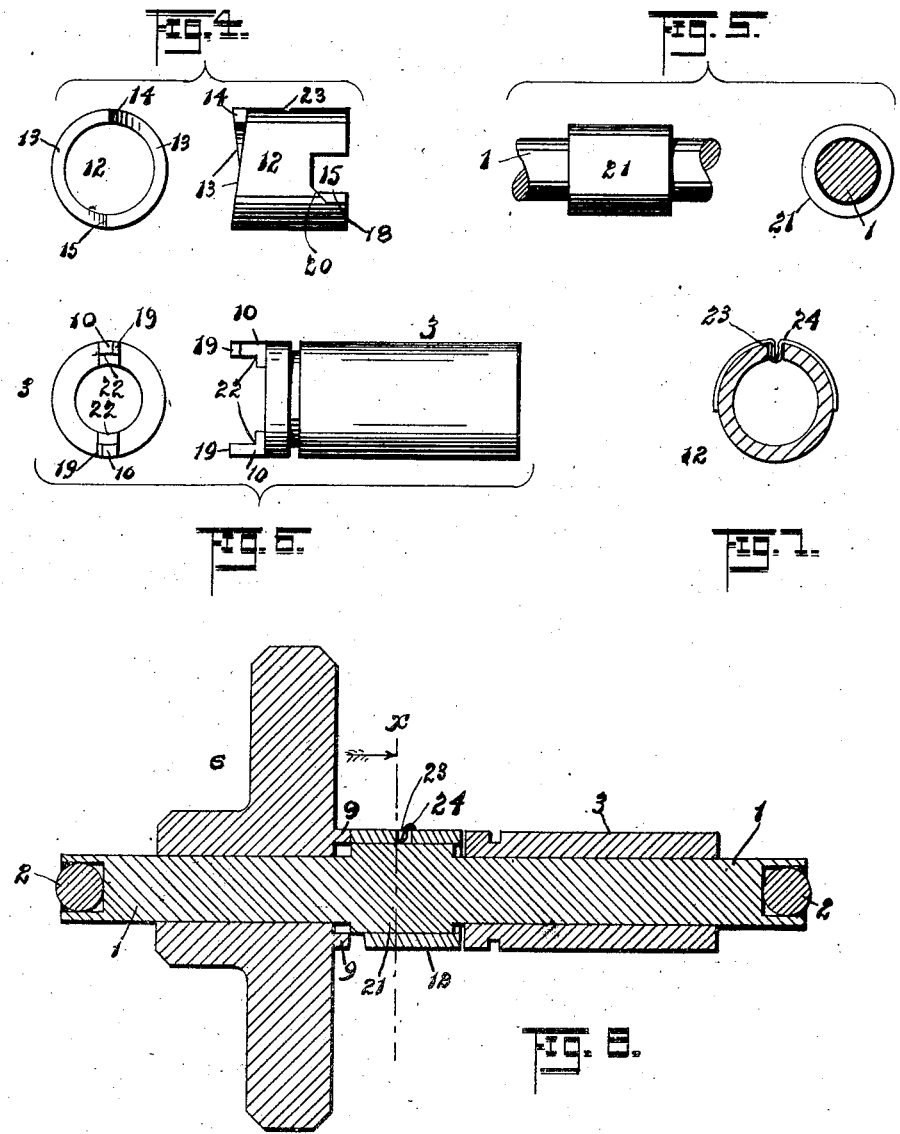

UNITED STATES PATENT OFFICE.

OSCAR ANDERSON, OF KEARNY, NEW JERSEY.

CLUTCH.

No. 878,177.     Specification of Letters Patent.     Patented Feb. 4, 1908.

Application filed August 21, 1906. Serial No. 331,432.

*To all whom it may concern:*

Be it known that I, OSCAR ANDERSON, a citizen of the United States, residing at Kearny, in the county of Hudson and State of New Jersey, have invented certain new and useful Improvements in Clutches, of which the following is a specification.

The objects of the invention are to provide a clutch adapted to transmit movement between two rotating parts upon the same shaft without involving longitudinal movement of either of the said parts; to provide between the said rotary, or driving and driven parts, a third part capable of independent longitudinal movement; to thus secure undisturbed action of the driving and driven parts; to obtain an automatic operation of the clutch; to provide a simple effective construction and one not liable to get out of order, and to obtain other advantages and results as may be brought out in the following description.

Referring to the accompanying drawings, in which like numerals of reference indicate corresponding parts in each of the several figures, Figure 1 is a view showing my improved clutch in side elevation, the same being in idle position, and Fig. 2 is a similar view showing the clutch in locked or operative position; Fig. 3 is an end view of the driven rotary part showing certain engagement pins thereof; Fig. 4 shows in end view and side elevation the intermediate member of my improved clutch; Fig. 5 shows in side elevation and end view a preferred form of that portion of the shaft upon which said intermediate member is located; Fig. 6 shows in end view and side elevation the driving member of the clutch; Fig. 7 is a cross-sectional view of the intermediate member taken on line $x$, Fig. 8, and showing a certain friction spring; Fig. 8 is a central longitudinal section of the entire device assembled, and Fig. 9 shows the specific application of my invention to a centrifugal cream separator.

In said drawings, 1 indicates a shaft upon which the parts of my improved clutch are shown as mounted, said shaft being adapted to be journaled in any suitable bearings (not shown), and having at its ends balls 2 to take up the end thrust. Upon said shaft I have shown as mounted, the driving and driven parts between which my improved clutch is adapted to transmit motion. One of these parts,—the driving one,—is shown as comprising a worm 3, which is driven by an outside worm gear 4 upon a shaft 5 in a plane at right angles to that of the shaft 1. The other part, which is the driven part, is shown as comprising a worm wheel 6 fast upon the shaft 1, as by means of its hub 7 being screwed thereto as at 8.

Obviously the relation of said parts as driving and driven could be reversed if desired, and either one could be fixed against rotation with respect to the shaft 1, while the other was left free, as will be understood. Furthermore instead of the worm and worm gear shown, any kind of driving pulley or spur gear might be employed upon the shaft 1, as will be obvious, and any means of driving employed. By my improved construction, however, longitudinal movement of the said driving and driven parts upon the shaft 1, is entirely unnecessary, and both may be held thereagainst as well as one, though as shown in the drawings, it is not necessary for both to be so held.

The driven member 6 is shown as provided on its hub with pins 9, 9, which project parallel to the shaft 1, and the driving member 3 has opposite end projections 10, 10 projecting towards said pins 9. Between the two said members is an immediate member 12 comprising a sleeve on the shaft 1, which is free both to slide longitudinally and to rotate. This sleeve is provided at its end adjacent to the pins 9, 9, with beveled or inclined portions of its end edges, as 13, 13, each of which occupies one-half the circumference, and slopes in depth from nothing at one end to a sufficient depth at the other end to receive against its end shoulder 14, one of the pins 9. The other end of the intermediate member or sleeve 12 is provided with notches or recesses 15 to receive the end projections 10 on the driving member. Said end projections always lie in the recesses 15, and have at one lateral side straight shoulders 16 adapted to engage correspondingly straight sides of the recesses and hold the sleeve 12 against turning when the driving member is stationary. The pins 9 upon the driven member, then ride up the inclines 13 and force the intermediate member toward the driving member into idle position. The other sides of the projections 10 are next their bases straight, as at 17, to engage corresponding straight portions 18 of the sides of the recesses, and out from said bases are beveled, as at 19, to engage correspondingly beveled surfaces 20 of the recesses. Thus as the driving member starts to turn, the beveled portions 19 of its projections engage the beveled surfaces 20 of the recess walls, and force the intermediate member or sleeve 12 longitudinally into engagement with the pins 9 of the driven member; further turning brings the straight portions 17 of the end projections against the straight sides 18 of the recesses to turn the intermediate member, and thus the driven member, with the driving member.

It will be noted that the sleeve 12 is of uniform inside diameter from end to end, and bears upon the shaft 1 for its entire length, so as to secure a firm stable bearing thereon. The notches or recesses are in the end edges of the tubular sleeve, and there is a considerable middle portion of the length of the sleeve which is not cut into at all, but provides at its inner surface a bearing upon the shaft for its entire circumference. By this construction, not only greater strength is secured, but also minimum lost motion and maximum durability.

I have shown in the drawings that portion of the shaft which receives the intermediate part or sleeve 12, enlarged as 21, and the end projections 10 of the driving member are undercut to project over said enlarged portion 21 and provide shoulders 22 to engage the end thereof and limit movement of the driving member. Obviously, however this feature is not essential to the operation of my improved device, and either one or both of the two members, driving and driven, may be fixed against longitudinal movement upon the shaft 1. No sliding movement is necessary for the worm 3, in the operation of my device, and it maintains a fixed position upon the shaft longitudinally of the same while being free to rotate or turn thereon.

Instead of the pins 9, and inclines 13 for the driven and intermediate parts of the clutch, I could if desired, employ a frictional engagement of any ordinary type, and furthermore the worm 3 might be any kind of a driving pulley or spur gear without departing from the spirit and scope of my invention. The notches 15, and their tongues or end extensions might also be reversed as to their locations upon the adjacent members, as will be understood.

For preventing too free or undesired motion of the intermediate member 12, upon the shaft 1, I perforate the side of said member, as at 23, and insert therein to bear upon the shaft 1, the doubled end of a wire spring 24, the arms of which extend partly around the intermediate member to secure a grasp thereof and force the doubled projection in the perforation 23 against the shaft. This insures a braking action of the intermediate member in case the movement of said member is too free, as for instance when the device is employed with the shaft 1 in upright position. In fact it would be necessary in such a case, if the driven member were uppermost, to positively secure longitudinal movement of the intermediate member, or if the driving member were uppermost to prevent the intermediate member falling away therefrom.

It will be noted that of the two sets of coöperating recesses and projections at the opposite ends of the intermediate member, the recesses of both sets are formed in the end edges of the intermediate member or sleeve. This is of great advantage since the recesses occupy so much less circumferential space than do the portions which would have to be cut out between projections. For a given length of sleeve, therefore, a much greater bearing area on the shaft is preserved by forming the recesses in the end edges of said sleeve and the coöperating projections on the other members. This is important, moreover, because the great torsional strain on the intermediate member tends very strongly to cramp it on the shaft, and at the same time it is highly desirable to shorten the length of the member as much as possible. Furthermore, it should be noted that the recesses 15 open radially outward through the periphery of the intermediate member or sleeve 12, or are exposed for the escape of dirt or other obstructions without any hindrance whatever. This is especially essential in a clutch of this particular character, since some one of the three engagements of a projection with the surfaces of its recess might easily be interfered with or prevented by the lodgment of dirt in the recess, and imperfect action of the clutch, or no action whatever, result therefrom. But by my improved construction as described, any foreign matter freely and readily escapes from the recess, or is forced out by the operation of the clutch, no opportunity for lodgement being afforded.

My improved construction of clutch is adapted to use in many and varied places where a clutch is employed, and while I do not desire to limit its application to any particular machine, I have shown in Fig. 9 the clutch as applied to a cream separator for the sake of greater convenience and clearness. In this drawing, 26 indicates the standard or body portion of the machine, providing bearings 27 for the ends of the shaft 1, the other parts of the clutch being as already described. The gear 6, thus works into the spindle (not shown), and the worm wheel 4 has its shaft 5 extending upward through an auxiliary portion 28 of the casing to the usual driving means, (not shown).

Obviously various detail modifications could be made in the mechanical construction of my invention by those skilled in the art, without departing from the spirit and scope of the invention, and I do not wish to be understood therefore as limiting myself by positive descriptive terms employed, except as the state of the art may require.

Having thus described the invention, what I claim is:

1. In a clutch, the combination of a shaft, driving and driven members arranged on said shaft, and an intermediate member also arranged on said shaft between the said driving and driven members and being capable of both rotary and longitudinal movement, the adjacent end edges of the driven and intermediate members having a set of coöperating clutch pins and recesses each presenting an inclined bottom 13 and end shoulder 14 and the adjacent end edges of the driving and intermediate members having a set of coöperating projections 10 and recesses 15 each presenting opposite parallel walls and a beveled bottom, the recesses of both said sets being cut in the end edges of the intermediate member and the clutch pins and projections being on the other members.

2. In a clutch, the combination of a shaft, driving and driven members arranged on said shaft, and an intermediate member also arranged on said shaft between the said driving and driven members and being capable of both rotary and longitudinal movement, the adjacent end edges of the driven and intermediate members presenting coöperating surfaces adapted to engage upon forward movement of the intermediate member and engage upon its stopping and the adjacent end edges of the driving and intermediate members having one a projection substantially parallel to the axis of rotation and the other a recess providing side walls substantially parallel to the axis of rotation and a beveled bottom, said recess opening radially outward through the periphery of the member and its said surfaces being adapted to be engaged by the coöperating projection to move the intermediate member longitudinally, to rotate it without tendency to longitudinal movement and to hold it against rotation.

3. In a clutch, the combination of a shaft, a driven member on said shaft, an intermediate member also on said shaft adapted to engage said driven member to turn the same and being capable of both rotary and longitudinal movement and having a perforation 23 through its wall, a spring extending transversely around the intermediate member for a portion of its circumference, a projection on said spring entering the said perforation in the intermediate member and engaging the shaft, said spring being adapted to force said projection against the shaft, and a driving member adapted to engage said intermediate member both to move it longitudinally and to rotate it without tendency to longitudinal movement.

4. In a clutch, the combination of a shaft, a driven member on said shaft, an intermediate member also on said shaft adapted to engage said driven member to turn the same and being capable of both rotary and longitudinal movement and having a perforation 23 through its wall, a spring having a doubled portion projecting into said perforation of the intermediate member and engaging the shaft and another portion extending transversely around the outside of the intermediate member and adapted to force the said doubled portion against the shaft, and a driving member adapted to engage said intermediate member both to move it longitudinally and to rotate it without tendency to longitudinal movement.

5. In a clutch, the combination of a driven member, a shaft on which said member is fixed, an intermediate member on said shaft adapted to engage said driven member to turn the same and being capable of both rotary and longitudinal movement, and a worm mounted upon said shaft and adapted at its end next the intermediate member to engage the same both to move it longitudinally and to rotate it without any tendency to longitudinal movement, that portion of the shaft upon which said worm is mounted being reduced and providing a shoulder to limit movement of the worm toward the intermediate member.

OSCAR ANDERSON.

In the presence of—
RUSSELL M. EVERETT,
ETHEL B. REED.